United States Patent
Moran

[11] Patent Number: 5,097,380
[45] Date of Patent: Mar. 17, 1992

[54] SECTIONALIZER CONTROL

[75] Inventor: Richard J. Moran, Milwaukee, Wis.

[73] Assignee: Cooper Power Systems, Inc., Houston, Tex.

[21] Appl. No.: 400,256

[22] Filed: Aug. 25, 1989

[51] Int. Cl.⁵ .............................................. H02H 3/52
[52] U.S. Cl. ...................................... 361/113; 361/76
[58] Field of Search ..................... 361/63, 76, 77, 85, 361/84, 113, 67

[56] References Cited

U.S. PATENT DOCUMENTS 4,470,091  9/1984  Sun et al. ............................ 361/113

Primary Examiner—Todd E. DeBoer
Attorney, Agent, or Firm—Nelson A. Blish; Gregory L. Maag

[57] ABSTRACT

The sectionalizer control provides a restraint signal responsive to a harmonic current which exceeds a threshold current for less than a preset time.

11 Claims, 1 Drawing Sheet

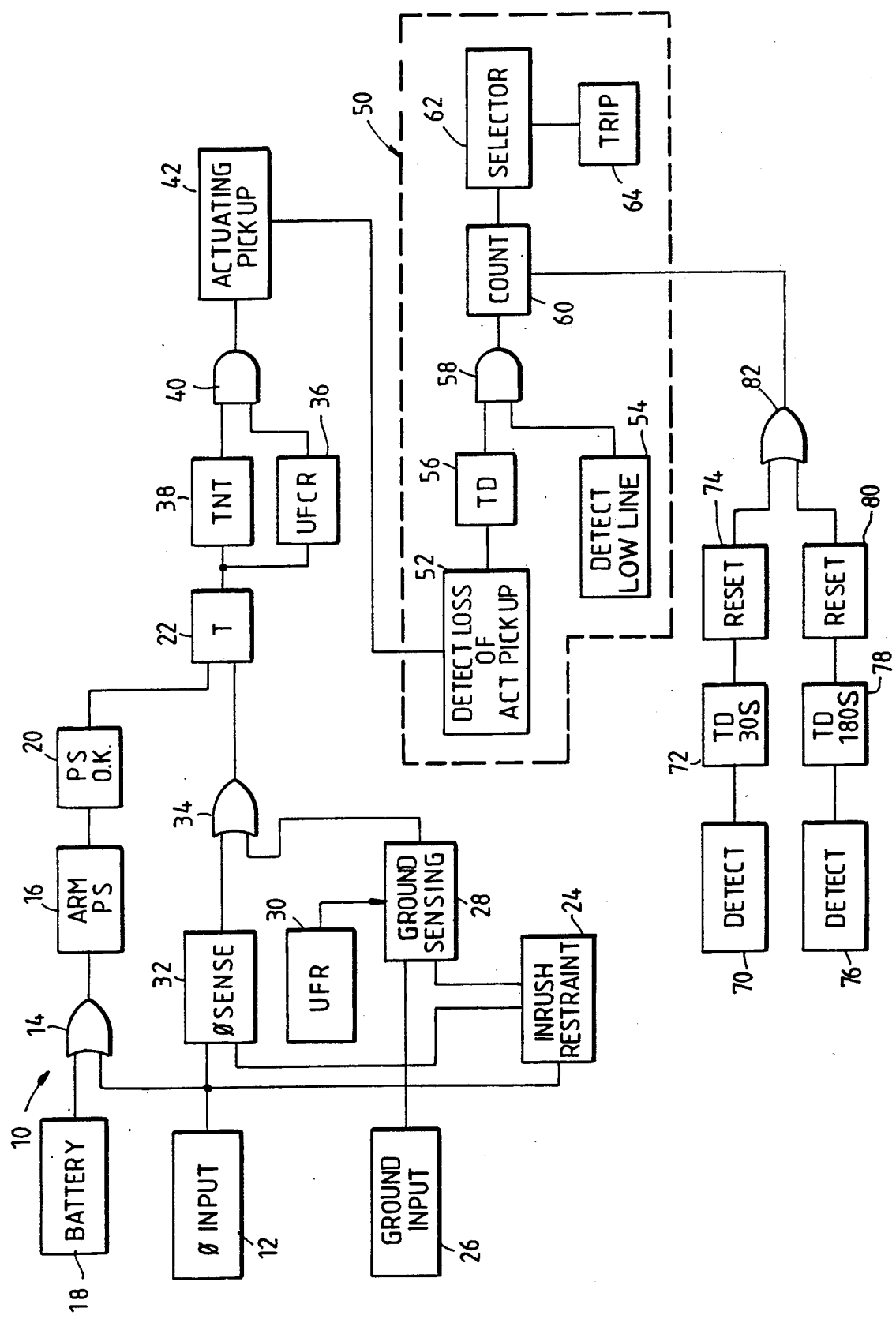

SECTIONALIZER CONTROL

BACKGROUND OF THE INVENTION

This invention relates to a control circuit for protection devices, and more particularly to a control circuit for an automatic sectionalizing switch.

In power generation and distribution it is common to have switchgear to protect downstream equipment at various points of the distribution system. A device, such as a recloser, will open on downstream electrical faults, reclose, and if the fault is still present downstream, open again. This is repeated a number of times, usually four or five times and if the fault is still present the recloser locks open.

Downstream from the recloser on branches of the electrical distribution network are devices called sectionalizers. Sectionalizers are designed to open or disconnect sections of the distribution network downstream of the recloser on the branch having the fault. The sectionalizer will count the number of times the sectionalizer sees the fault and the number of times the current goes to zero when the recloser opens. The sectionalizer will then open on a predetermine number of counts. The sectionalizer furthest downstream from the generating source will have the smallest number of counts before it opens and remains open. This is done so that faults on the system can be isolated as far downstream from the generating source as possible. There may be as many as four sectionalizers between the recloser and a load. The sectionalizer closest to the load would open first, on one count, the next one upstream would open on two counts and so on.

A problem is encountered when the sectionalizers count as a downstream fault, an electrical fault on the upstream side of the sectionalizer. This will cause the sectionalizer to open, indicating to linemen trying to solve the problem on the distribution network, that the fault is downstream of the open sectionalizer. These up-line fault problems may be due to a number of things, one of which would be a phase to ground fault having small fault resistance. This would cause over voltage on the two unfaulted phases, which causes slightly higher current on those two unfaulted phases. If a transformer downstream saturates due to over voltage, it would draw high exciting current twice per cycle during voltage peaks, which would cause pickup on threshold sensing devices in the sectionalizer.

Another up-line problem which may cause sectionalizers to count incorrectly is that unsymmetrical fault clearing may occur at the recloser. That is, the different phases may be opened by the recloser at different times, which gives a phase imbalance in the currents, which causes the sectionalizer to count incorrectly. When one phase current goes to zero and the other phases are still energized, a large neutral, or ground, current is created.

SUMMARY OF THE INVENTION

The present invention is for a sectionalizer control having five restraints. Two of the restraints are old, the count restraint which detects load current and prevents counting if load current is present, and the inrush restraint which prevents counting when the circuit is first energized due to large inrush currents.

One of the three new restraints prevents counting skinny spikes or spikes in current due to harmonic transients referred to by the acronym TNT, which is a threshold above which the current must remain for a period of time in order to actuate pickup current. The problem with unsymmetrical fault clearing is avoided by use of means to detect the first time the threshold is exceeded, and disabling actuating pickup means for one-half cycle or longer. The third restraint is an upline fault detection restraint. This operates by measuring the current on the individual phases, and when any current falls to less than 50% of steady state current it locks out ground sensing as a means of providing an actuating pick up signal. This last restraint operates in conjunction with the unsymmetrical fault clearing restraint in that the fault clearing restraint prevents actuating pickup for the first 15 milliseconds.

BRIEF DESCRIPTION OF THE DRAWING

The FIGURE shows a sectionalizer as a block diagram.

DETAILED DESCRIPTION OF THE INVENTION

A sectionalizer control is shown in general by reference 10. Current transformers 12 provides three phase currents to sectionalizer control 10. Arming power supply 16 is armed by phase input current transformers 12 or battery 18 through orgate 14. In the preferred embodiment battery 18 is a 9 volt lithium battery. When arming power supply 16 voltage exceedes 14 volts, power supply checker 20 sends a signal to allow threshold sensing. Threshold sensor 22 which is not activated until a signal is received from power supply checker 20, that power supply voltage above is a preset minimal level.

In-rush restraint 24 senses phase A, B or C and either waits three seconds before it will allow ground sensing or phase sensing, or will allow ground sensing or phase sensing immediately depending on internal logic. Internal logic will allow immediate sensing if actuating pickup had occurred in the past. Also if there is no actuating pickup present it will time for 5 seconds and will reset the latch such that there will always be a 3 second delay when current first starts flowing.

Ground input sensing device 26 is a transformer which takes a vector sum of three phase currents, and provides the input to ground sensing device 28. Upline fault detection restraint (UFDR) 30 measures the current on an of three phases. When the value of the current falls to less than 50%, or any predetermined percentage of steady state current, UFDR 30 disables ground sensing circuit 28 for a predetermined time period.

Phase sensor 32 sets the actuating current level for any one phase. Input sensor 32 is supervised by inrush restraint 24. Ground sensor 28 and phase sensor 32 provide input current to or gate 34, which allows threshold sensing device 22 to operate and trigger TNT device 38. TNT device 38 requires that current exceed a certain threshold for a certain time.

Unsymmetrical fault clearing restraint (UFCR) 36 disables TNT 38 for a short period of time, at least one-half cycle, and then allows output of TNT 38 pickup to TNT output to create actuating pickup.

And gate 40, in order to pass a signal to actuating pickup 42, requires device 38 to put out a signal, and UFCR 36 not to restrain.

Actuating pickup 42 provides a signal to count restraint 50. Count restraint 50 acts as follows. On loss of actuating pickup 52, time delay 56 provided a time delay after which a count is made, provided there is no low line current. If line current is present, low line current device 54 working in conjunction with delay 56, and logic 58 provides correct input to count. The count is totaled on counter 60. After a predetermined count has been selected on selector 62, the signal to trip is passed to trip and lock out device 64. If certain logic is detected: one, count is not zero; two, no actuating pickup; three, line current is present; then detector device 70 will start a time delay of 30 seconds. Device 72 then triggers a reset pulse 74 to reset the counter 60. This means reclosing is successful and the fault is no longer present. Device 74 feeds through orgate circuit 82 and feeds into counter 60 to reset the count.

In a similar manner if the detect 76 count is not zero, no actuating pickup and no line current for a long period of time at device, timer 78 counts two minutes, then triggers a reset pulse 80 to reset the count. Then the recloser is locked open, or the line is down, or something else is wrong. Device 80 will feed through device 82 and reset the counter 60.

I claim:

1. A sectionalizer switch for an electrical distribution system that is operating at a synchronous system frequency, the improvements therein comprising:
   a first means for preventing actuation of said switch by rejecting harmonic currents which exceed a threshold current and do not remain above that threshold for a preset time; and
   a second means for preventing actuation of said switch for at least one-half cycle when current of the system frequency reaches said threshold, said second preventing means comprising an Unsymmetrical Fault Clearing Restraint (UFCR).

2. A sectionalizer as in claim 1 wherein:
   an upline fault detection means detects a current less than a preset percent of steady state, on any phase, during the period UFCR is on and disables ground sensing for a predetermined time period.

3. A sectionalizer as in claim 2 wherein:
   said preset current is approximately 50% of said steady state current.

4. A sectionalizer as in claim 2 wherein said predetermined time period is approximately 2 seconds.

5. A sectionalizer as in claim 1 wherein said preset time is approximately 2.5 msec.

6. A sectionalizer switch for a three-phase electrical distribution system operating at a synchronous system frequency, comprising:
   means for detecting the magnitude of currents in the three-phase electrical distribution system;
   means for generating an actuating signal for opening said sectionalizer switch;
   a first means for restraining the generation of said actuation signal when the magnitude of harmonic currents detected by said detection means exceeds a predetermined threshold value and said harmonic currents are present on the system for less than a first predetermined time period; and
   a second means for restraining the generation of said actuation signal for at least one-half cycle when the magnitude of the current of the system frequency detected by said detection means exceeds said predetermined threshold value.

7. The sectionalizer switch of claim 6 further comprising:
   a third means for restraining the generation of said actuation signal for a second predetermined time period when the magnitude of the current of the system frequency detected on any phase of the system is less than a predetermined percentage of the steady state phase current magnitude.

8. The sectionalizer switch of claim 7 wherein said predetermined percentage is approximately 50%.

9. The sectionalizer switch of claim 7, wherein said second predetermined time period is approximately 2 seconds.

10. The sectionalizer switch of claim 6 wherein said first predetermined time period is approximately 2.5 msec.

11. A control circuit for generating a trip signal for a sectionalizer switch in a three phase power distribution system, comprising:
    means for generating a trip signal when the magnitude of the phase current exceeds a predetermined threshold value;
    means for restraining generation of said trip signal when the magnitude of harmonic currents on the system exceed said threshold value but are present for less than approximately 2.5 msec;
    means for restraining generation of said trip signal for at least one-half cycle after the magnitude of the synchronous phase current first exceeds said threshold value; and
    means for restraining the generation of said trip signal for at least approximately 2 seconds after the magnitude of the synchronous current on any phase falls below approximately 50% of the steady state phase current magnitude.

* * * * *